United States Patent
Won et al.

(10) Patent No.: US 11,167,763 B2
(45) Date of Patent: Nov. 9, 2021

(54) COASTING DRIVING CONTROL METHOD AND SYSTEM FOR VEHICLE

(71) Applicants: Hyundai Motor Company, Seoul (KR); Kia Motors Corporation, Seoul (KR)

(72) Inventors: Chan Hee Won, Seoul (KR); Jung Sup Byun, Seongnam-si (KR); Sang Wook Nam, Goyang-si (KR); Kwan Ho Lee, Gwangmyeong-si (KR); Seong Kyu Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 175 days.

(21) Appl. No.: 16/589,958

(22) Filed: Oct. 1, 2019

(65) Prior Publication Data
US 2020/0377097 A1 Dec. 3, 2020

(30) Foreign Application Priority Data
May 31, 2019 (KR) .................. 10-2019-0064742

(51) Int. Cl.
*B60W 30/18* (2012.01)
*B60W 10/10* (2012.01)

(52) U.S. Cl.
CPC ...... *B60W 30/18072* (2013.01); *B60W 10/10* (2013.01); *B60W 30/18054* (2013.01); *B60W 2510/0642* (2013.01); *B60W 2520/28* (2013.01)

(58) Field of Classification Search
CPC ........... B60W 30/18072; B60W 10/10; B60W 30/18054; B60W 2510/0642; B60W 2520/28
See application file for complete search history.

(56) References Cited

U.S. PATENT DOCUMENTS

| 4,846,283 | A | * | 7/1989 | Batcheller | ............ | A01B 63/112 |
| | | | | | | 172/10 |
| 5,441,464 | A | * | 8/1995 | Markyvech | ........... | B60W 10/06 |
| | | | | | | 477/109 |
| 2007/0173372 | A1 | * | 7/2007 | Ueno | .............. | B60W 30/18072 |
| | | | | | | 477/3 |
| 2008/0168964 | A1 | * | 7/2008 | Kimura | ................. | F02D 41/021 |
| | | | | | | 123/325 |
| 2011/0230308 | A1 | * | 9/2011 | Inoue | .................... | F02D 41/023 |
| | | | | | | 477/54 |

(Continued)

FOREIGN PATENT DOCUMENTS

| KR | 10-1256325 B1 | 4/2013 |
| KR | 10-2015-0025213 A | 3/2015 |
| KR | 10-1749829 B1 | 6/2017 |

Primary Examiner — Tyler J Lee
Assistant Examiner — Yufeng Zhang
(74) Attorney, Agent, or Firm — Morgan, Lewis & Bockius LLP

(57) ABSTRACT

A coasting driving control method and system for a vehicle may determine virtual engine RPM for a current driving state using engine RPM, vehicle speed, and gear stage information by a controller when coasting is started with the clutch in the neutral position and outputs a downshifting instruction signal for a gear stage by the controller when the virtual engine RPM is less than a coasting engine RPM which is greater than an idling RPM by a predetermined value.

16 Claims, 6 Drawing Sheets

(56) References Cited

U.S. PATENT DOCUMENTS

2012/0108391 A1* 5/2012 Nagashima ........... B60W 20/30
477/176
2012/0265382 A1* 10/2012 Nefcy ................. B60W 10/115
701/22

* cited by examiner

COASTING DRIVING CONTROL METHOD AND SYSTEM FOR VEHICLE

CROSS-REFERENCE TO RELATED APPLICATION

The present application claims priority to Korean Patent Application No. 10-2019-0064742, filed on May 31, 2019 in the Korean Intellectual Property Office, the entire contents of which is incorporated herein for all purposes by this reference.

BACKGROUND OF THE PRESENT INVENTION

Field of the Invention

The present invention relates to a coasting driving control method and system for a vehicle that provides downshifting information suitable for engine behavior according to deceleration by estimating the engine behavior when the vehicle coasts.

Description of Related Art

Not only Neutral Coasting Control (NCC) that moves a transmission to a neutral position, but also Start Stop Coasting control (SSC) that additionally stops the operation of an engine are being increasingly applied to improve fuel efficiency by maximizing the coasting distance when a vehicle coasts.

According to an E-Clutch system, a controller controls a clutch when shifting, so a coasting control strategy may be applied, but a drive has to shift up or down manually. Accordingly, there is a problem in that unless a driver downshifts appropriately in accordance with a deceleration level during NCC or SSC, it may cause engine stop, engine malfunction, and poor reacceleration performance when the NCC or SSC is finished.

FIG. 1 shows engine RPM behavior during costing according to SSC. During SSC, the engine RPM maintains an off-state regardless of the vehicle speed and the gear state, so a driver has difficulty in downshifting on the basis of his or her experience or intuition.

Accordingly, unless downshifting suitable for a vehicle speed is performed during SSC, the vehicle speed is low and a relatively high gear has been engaged when the SSC is finished. Therefore, the engine RPM become unstable when a clutch is engaged, so there is a problem in that engine stop, engine malfunction, and poor reacceleration performance are caused.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a coasting driving control method and system for a vehicle that provides downshifting information suitable for engine behavior according to deceleration by estimating the engine behavior when the vehicle coasts.

In view of an aspect, a coasting driving control method of controlling a coasting of a vehicle by moving a clutch of a transmission to a neutral position while a vehicle is being driven may include: determining a virtual engine RPM for a current driving state using engine RPM, vehicle speed, and gear stage information by a controller when coasting is started with the clutch in the neutral position; and outputting a downshifting instruction signal for a gear stage by the controller when the virtual engine RPM is less than a coasting engine RPM which is greater than an idling RPM by a predetermined value.

A downshifting recommendation signal for the gear stage and recommended gear stage information may be output to a cluster.

In view of another aspect, a coasting driving control method of controlling a coasting of a vehicle by moving a clutch of a transmission to a neutral position while a vehicle is being driven may include: determining virtual coasting gear ratio for a current driving state using engine RPM, vehicle speed, and gear stage information by a controller when coasting is started with the clutch in the neutral position; and outputting a downshifting instruction signal by the controller when the virtual coasting gear ratio exceeds a gear ratio of a gear stage at a point in time of starting to coast.

The virtual gear ratio for coasting may be determined from the following Formula (1), $$\text{virtual gear ratio for coasting} = \frac{\text{engine RPM in coasting}}{\text{current vehicle speed}} \times \frac{\begin{array}{c}\text{vehicle speed at time point of} \\ \text{starting to coast} \times \text{gear ratio of} \\ \text{gear stage at time point of starting to coast}\end{array}}{\text{engine RPM at time point of starting to coast}}. \quad (1)$$

Engine RPM for coasting=idling RPM+α (set at a level that can maintain acceleration of vehicle).

A downshifting recommendation signal for the gear stage and recommended gear stage information may be output to a cluster.

A downshifting recommendation signal for the gear stage and recommended gear stage information may be output using a voice in the vehicle.

In view of another aspect, a coasting driving control system of controlling a coasting of a vehicle by moving a clutch of a transmission to a neutral position while a vehicle is being driven may include: a virtual RPM calculator that determines virtual engine RPM for a current driving state using engine RPM, vehicle speed, and gear stage information by a controller when coasting is started with the clutch in the neutral position; and an instruction output unit that outputs a downshifting instruction signal for a gear stage by the controller when the virtual engine RPM determined by the virtual RPM calculator is less than a coasting engine RPM which is greater than an idling RPM by a predetermined value.

In view of another aspect, a coasting driving control system of controlling a coasting of a vehicle by moving a clutch of a transmission to a neutral position while a vehicle is being driven may include: a virtual gear ratio calculator that determines virtual coasting gear ratio for a current driving state using engine RPM, vehicle speed, and gear stage information by a controller when coasting is started with the clutch in the neutral position; and an instruction output unit that outputs a downshifting instruction signal by the controller when the virtual coasting gear ratio determined by the virtual gear ratio calculator exceeds a gear ratio of a gear stage at a point in time of starting to coast.

According to an exemplary embodiment of the present invention, there is an effect in that appropriate downshifting appropriate for a vehicle speed is induced by providing a point in time of downshifting and recommended downshifting gear stage information to a driver during coasting, so engine stop, engine malfunction, and poor reacceleration performance are prevented when the NCC or SSC is finished.

Furthermore, in the method of outputting a point in time of downshifting by applying the concept of a virtual coasting gear ratio, there is another effect that it is possible to determine a recommended downshifting gear stage even without information such as a differential gear ratio and a tire rolling radius, so that the present invention may be applied to various types of vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
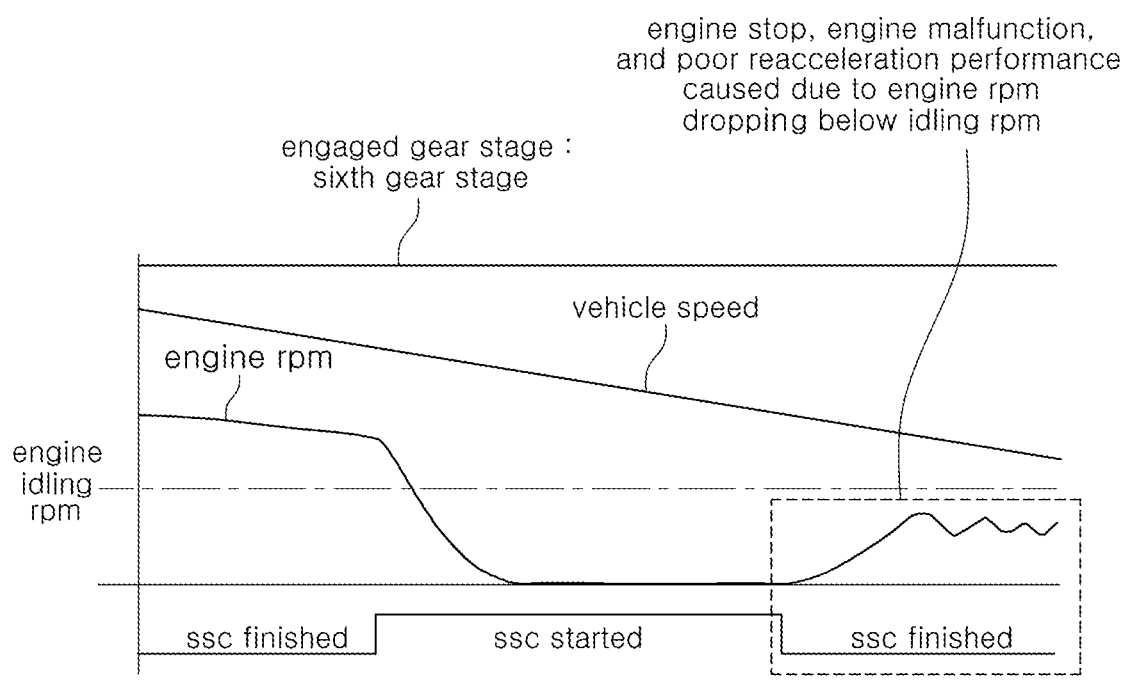
FIG. 1 is a diagram showing engine RPM behavior during coasting according to SSC in the related art.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention are described hereafter in detail with reference to the accompanying drawings.

Of vehicles in which shifting is performed on the basis of a manual shifting mechanism, the present invention may be applied to vehicles provided with an E-Clutch system in which when a driver operates a shift lever to shift, a controller CLR shifts by automatically controlling the operation of a clutch.

The controller CLR according to an exemplary embodiment of the present invention may be implemented through a nonvolatile memory configured to store algorithms for controlling operation of various components of a vehicle or data about software commands for executing the algorithms, and a processor configured to perform operation to be described below using the data stored in the memory. The memory and the processor may be individual chips. Alternatively, the memory and the processor may be integrated in a single chip. The processor may be implemented as one or more processors.

Figure 2:
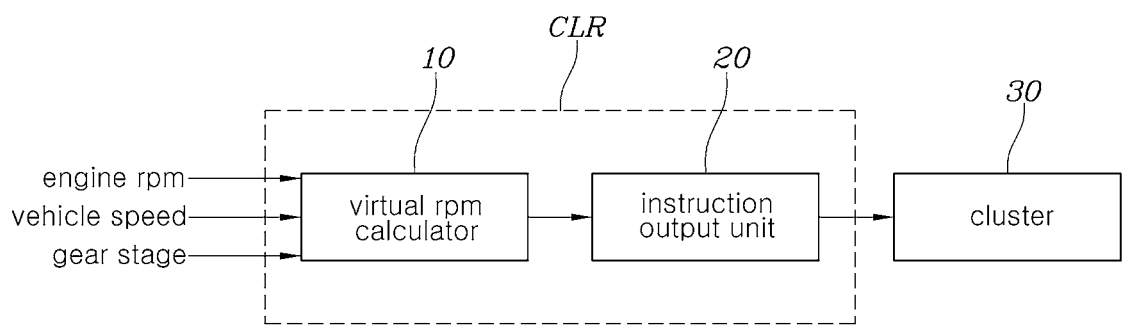
FIG. 2 is a diagram showing the configuration of various exemplary embodiments of a coasting driving control system according to an exemplary embodiment of the present invention.
Figure 3:
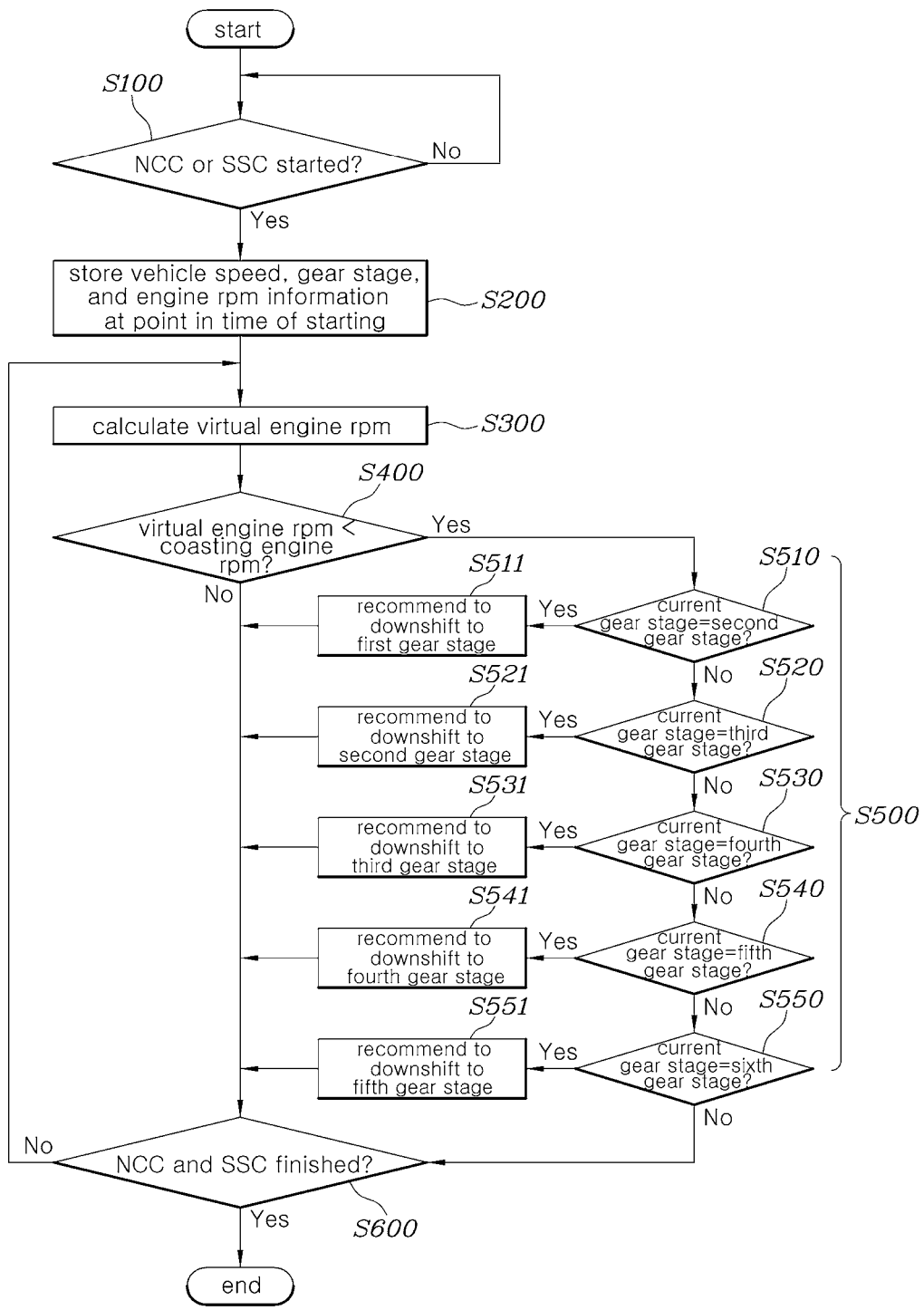
FIG. 3 is a diagram showing a coasting process according to the configuration of FIG. 2.

An exemplary embodiment of a coasting driving control method according to an exemplary embodiment of the present invention, referring to FIG. 2 and FIG. 3, may include: determining a virtual engine RPM; and outputting a downshifting instruction on the basis of the determined virtual engine RPM.

In detail, in the determining of a virtual engine RPM, when a vehicle starts coasting with a clutch in a neutral position, a controller CLR determines virtual engine RPM according to the current driving state using engine RPM, vehicle speed, and gear stage information.

In the present process, the clutch may be controlled to the neutral position by Neutral Coasting Control (NCC) or Start Stop Coasting control (SSC), so that the vehicle can coast.

In the outputting of a downshifting instruction, when the virtual engine RPM is less than a coasting engine RPM which is greater than an idling RPM by a predetermined value, the controller CLR can output a downshifting instruction signal for a gear stage.

The coasting engine RPM, which is an engine RPM that can maintain acceleration of the vehicle with the clutch engaged, is set to be at least greater than the idling RPM.

Furthermore, in the outputting of a downshifting instruction, a downshifting recommendation signal for a gear stage and recommended gear stage information may be controlled to be output to a cluster 30 or may be controlled to be output through a speaker in the vehicle using a voice.

Figure 6:
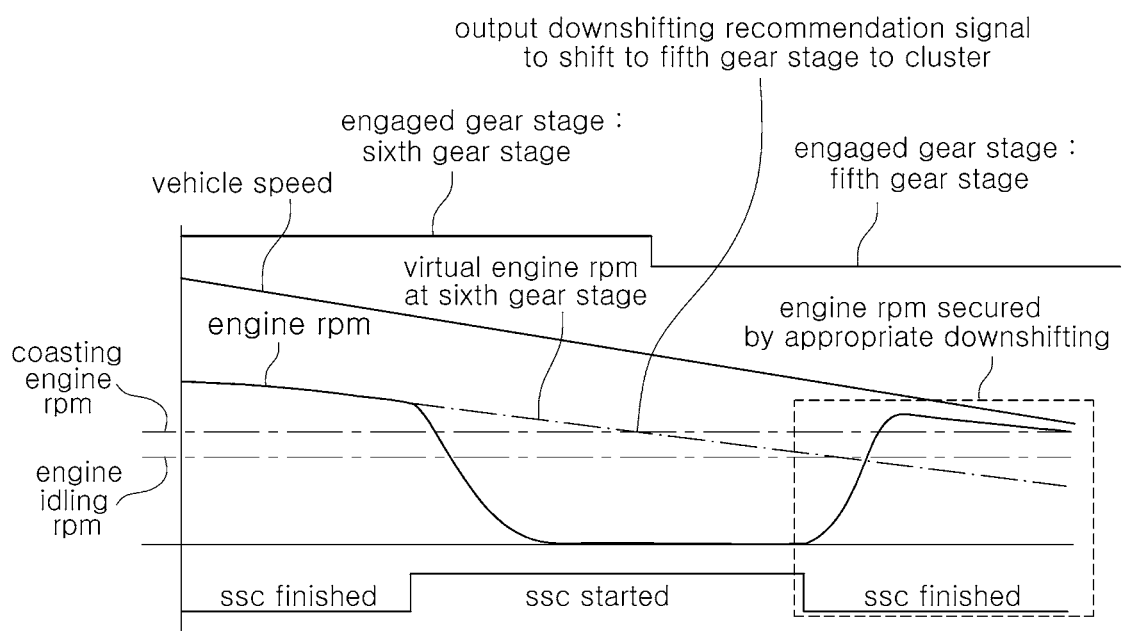
FIG. 6 is a diagram showing engine RPM behavior during coasting according to SSC in an exemplary embodiment of the present invention.

For example, as shown in FIG. 6, in the case in which a vehicle starts coasting with the sixth gear stage engaged, when the virtual engine RPM becomes lower than the coasting engine RPM, an instruction to downshift to a fifth gear stage may be output to the cluster 30.

Accordingly, appropriate downshifting for a vehicle speed is induced by providing a point in time of downshifting and recommended downshifting gear stage information to a driver during coasting, so engine stop, engine malfunction, and poor reacceleration performance are prevented when the NCC or SSC is finished.

Figure 4:
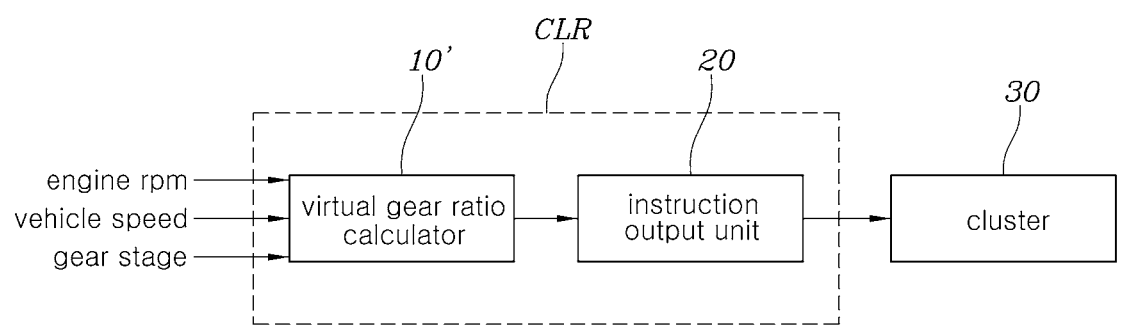
FIG. 4 is a diagram showing the configuration of various exemplary embodiments of a coasting driving control system according to an exemplary embodiment of the present invention.
Figure 5:
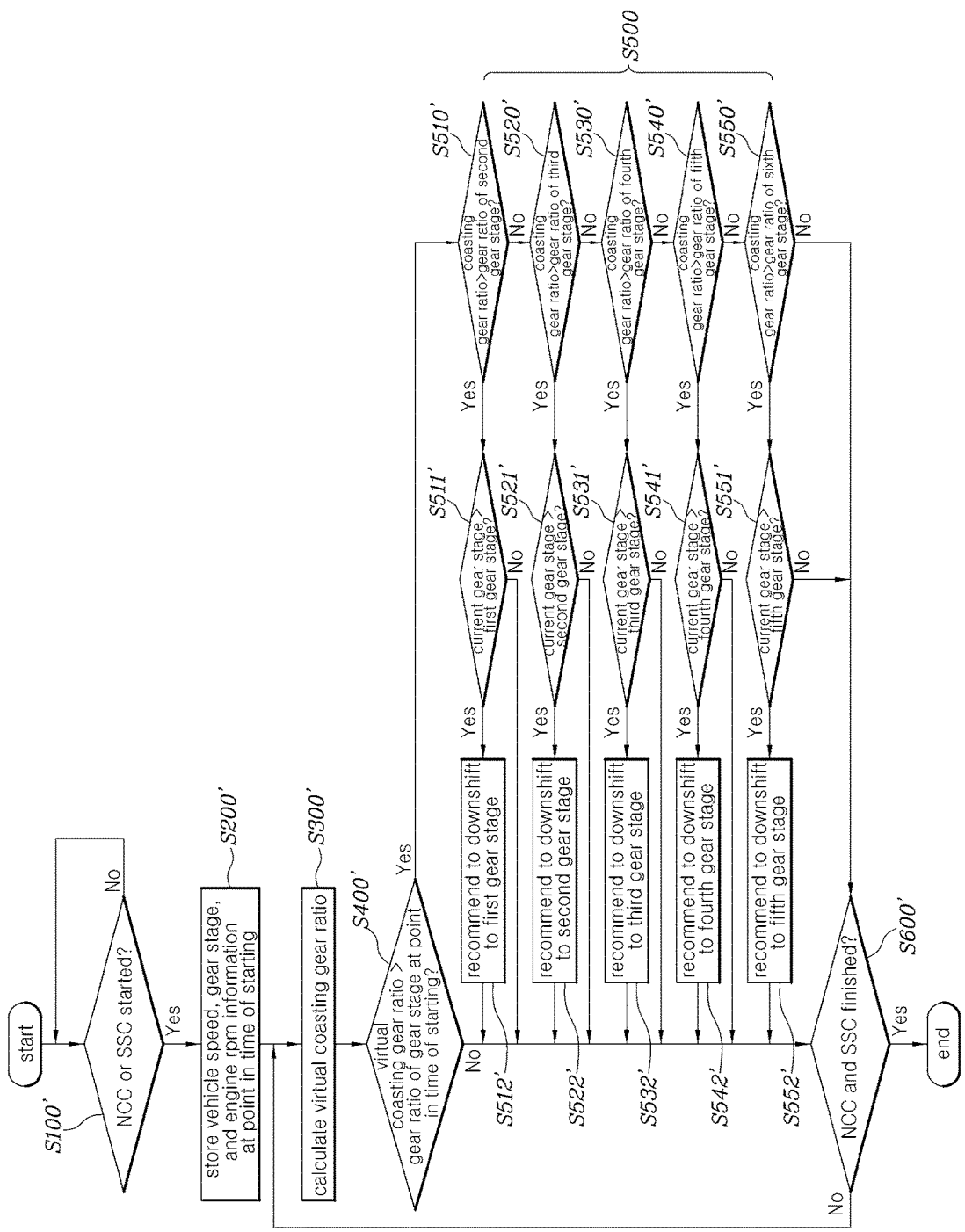
FIG. 5 is a diagram showing a coasting process according to the configuration of FIG. 4.

On the other hand, another exemplary embodiment of the coasting driving control method according to an exemplary embodiment of the present invention, referring to FIG. 4 and FIG. 5, may include: determining a virtual gear ratio; and outputting a downshifting instruction on the basis of the determined virtual gear ratio.

In detail, in the determining of a virtual gear ratio, when a vehicle starts coasting with a clutch in a neutral position, a controller CLR determines a virtual coasting gear ratio according to the current driving state using engine RPM, vehicle speed, and gear stage information.

The virtual gear ratio for coasting may be determined from the following Formula (1), $$\text{virtual gear ratio for coasting} = \frac{\text{engine RPM in coasting}}{\text{current vehicle speed}} \times \frac{\begin{array}{c}\text{vehicle speed at time point of}\\\text{starting to coast} \times \text{gear ratio of}\\\text{gear stage at time point of starting to coast}\end{array}}{\text{engine RPM at time point of starting to coast}}. \quad (1)$$

Engine RPM in coasting=idling RPM+α (set at a level that can maintain acceleration of vehicle).

In the outputting of a downshifting instruction, when the virtual coasting gear ratio exceeds the gear ratio of the gear stage at the point in time of starting to coast, the controller CLR can output a downshifting instruction signal for a gear stage.

Furthermore, in the outputting of a downshifting instruction, a downshifting recommendation signal for a gear stage and recommended gear stage information may be controlled to be output to the cluster 30 or may be controlled to be output through a speaker in the vehicle using a voice.

For example, as shown in FIG. 6, in the case in which a vehicle starts coasting with the sixth gear stage engaged, when the virtual coasting gear ratio becomes greater than the gear ratio of the sixth gear stage at the point in time of starting to coast, an instruction to downshift to the fifth gear stage may be output to the cluster 30.

Accordingly, appropriate downshifting for a vehicle speed is induced by providing a point in time of downshifting and recommended downshifting gear stage information to a driver during coasting, so engine stop, engine malfunction, and poor reacceleration performance are prevented when the NCC or SSC is finished.

Meanwhile, various exemplary embodiments of a coasting driving control system according to an exemplary embodiment of the present invention may include a virtual RPM determination unit 10 and an instruction output unit 20. The virtual RPM determination unit 10 and the instruction output unit 20 may be included in a controller CLR, as shown in FIG. 2.

Referring to the figures, when a vehicle starts coasting with a clutch at a neutral position, the virtual RPM calculator 10 determines virtual engine RPM according to the current driving state using engine RPM, vehicle speed, and gear stage information.

That is, the engine RPM, vehicle speed, and gear stage information is transmitted to the virtual RPM calculator 10, whereby it is possible to determine the virtual engine RPM during coasting on the basis of the transmitted information.

Furthermore, when the virtual engine RPM determined by the virtual RPM calculator 10 is less than a coasting engine RPM which is greater than the idling RPM by a predetermined value, the instruction output unit 20 can output a downshifting instruction signal for a gear stage.

Accordingly, the general control flow of the coasting driving control process according to the various exemplary embodiments is described with reference to FIG. 3. Whether control for moving a clutch to a neutral position is started by NCC or SSC while a vehicle is being driven is determined (S100).

When the control for moving a clutch to a neutral position has been started, as the result of determination in S100, vehicle speed, gear stage, and an engine RPM information at the point in time of starting the control for moving a clutch to a neutral position is stored (S200) and virtual engine RPM is determined on the basis of the stored information (S300).

Next, the determined virtual engine RPM and coasting engine RPM are compared (S400), and when the virtual engine RPM is less than the coasting engine RPM as the result of the comparison, the current gear stage is verified (S500) and a downshifting instruction to shift to a lower gear stage than the current gear stage is output.

That is, when the current gear stage is second gear stage (S510), a downshifting instruction to shift to the first gear stage is output (S511), when it is the third gear stage (S520), a downshifting instruction to shift to the second gear stage is output (S521), and downshifting instructions to shift to lower stages are output for the other gear stages (S530, S531), (S540, S541), and (S550, S551).

Next, after a downshifting instruction is output, whether NCC or SSC that has been applied to move the clutch to the neutral position is finished is determined (S600), and when NCC or SSC are progressing, as the result of the determination, the process moves to step S300 and outputs a virtual engine RPM. Alternatively, when NCC or SSC has been finished, the logic is terminated.

Obviously, when the virtual engine RPM is the coasting engine RPM or more, as the result of the determination in S400, it means that a downshifting recommendation reference is not satisfied, so that the process can move to S600 and determine whether NCC or SSC that has been applied to move the clutch to the neutral position is finished.

Meanwhile, various exemplary embodiments of a coasting driving control system according to an exemplary embodiment of the present invention may include a virtual gear ratio determination unit 10' and an instruction output unit 20. The virtual gear ratio determination unit 10' and the instruction output unit 20 may be included in a controller CLR, as shown in FIG. 4.

Referring to the figures, when a vehicle starts coasting with a clutch in a neutral position, the virtual gear ratio determination unit 10' determines a virtual coating gear ratio according to the current driving state using engine RPM, vehicle speed, and gear stage information.

That is, engine RPM, vehicle speed, and gear stage information are transmitted to the virtual RPM determination unit 10, whereby it is possible to determine the virtual coasting gear ratio during coasting on the basis of the transmitted information.

Furthermore, when the virtual coasting gear ratio determined by the virtual gear ratio determination unit 10' exceeds the gear ratio of the gear stage at the point in time of starting to coast, the instruction output unit 20 can output a downshifting instruction signal for a gear stage.

Accordingly, the general control flow of the coasting driving control process according to the various exemplary embodiments is described with reference to FIG. 5. Whether control for moving a clutch to a neutral position is started by NCC or SSC while a vehicle is being driven is determined (S100').

When the control for moving a clutch to a neutral position has been started, as the result of the determination in S100', vehicle speed, gear stage, and an engine RPM information at the point in time of starting control for moving a clutch to a neutral position is stored (S200') and a virtual coasting gear ratio is determined on the basis of the stored information (S300').

Next, the determined virtual coasting gear ratio and the gear ratio of the gear stage at the point in time of starting control for moving a clutch to a neutral position are compared (S400'), and as the result of the comparison, when the virtual coasting gear ratio exceeds the gear ratio of the gear stage at the point in time of starting control for moving a clutch to a neutral position, the virtual coasting gear ratio and the gear ratio of the current gear stage are compared (S500') and a downshifting instruction to shifting to a lower gear stage than the current gear stage is output.

That is, whether the virtual coasting gear ratio is greater than the gear ratio of the second gear stage is determined (S510'), and as the result of the determination, when the virtual coasting gear ratio is greater than the gear ratio of the second gear stage, whether the current gear stage exceeds the first gear stage is determined (S511'), and as the result of determination in S511', when the current gear stage exceeds the first gear stage, a downshifting instruction to shift to the first gear stage is output (S512').

However, as the result of the determination in S510', when the virtual coasting gear ratio is not greater than the gear ratio of the second gear stage, whether the coasting gear ratio is greater than the gear ratio of the third gear stage is determined (S520'), and as the result of the determination, when it is greater than the gear ratio of the third gear stage, whether the current gear stage exceeds the second gear stage is determined (S521'), and as the result of the determination in S521', when the current gear stage exceeds the second gear stage, a downshifting instruction to shift to the second gear stage is output (S522').

Downshifting instructions to shift to lower gear stages are output for the other gear stages in accordance with the present logic (S530', S531', S532'), (S540', S541', S542'), and (S550', S551', S552').

Next, after a downshifting instruction is output, whether NCC or SSC that has been applied to move the clutch to the neutral position is finished is determined (S600'), and when NCC or SSC are progressing, as the result of determination, the process moves to step S300' and determines a virtual engine RPM. Alternatively, when NCC or SSC has been finished, the logic is terminated.

Obviously, when the virtual engine RPM is the coasting engine RPM or Moreover, as the result of the determination in S400', it means that a downshifting recommendation reference is not satisfied, so that the process can move to S600' and determine whether NCC or SSC that has been applied to move the clutch to the neutral position is finished.

As described above, according to an exemplary embodiment of the present invention, appropriate downshifting for a vehicle speed is induced by providing a point in time of downshifting and recommended downshifting gear stage information to a driver during coasting, so engine stop, engine malfunction, and poor reacceleration performance are prevented when the NCC or SSC is finished.

Furthermore, in the method of outputting a point in time of downshifting by applying the concept of a virtual coasting gear ratio, it is possible to determine a recommended downshifting gear stage even without information such as a differential gear ratio and a tire rolling radius, so that the present invention may be applied to various types of vehicles.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A coasting driving control method of controlling a coasting of a vehicle by moving a clutch of a transmission to a neutral position while the vehicle is being driven, the method comprising:
   determining, by a controller, virtual engine revolutions per minute (RPM) for a current driving state of the vehicle using engine RPM, vehicle speed, and gear stage information upon determining that the coasting is started with the clutch in the neutral position; and
   outputting, by the controller, a downshifting instruction signal for a gear stage upon determining that the virtual engine RPM is less than a coasting engine RPM which is greater than an idling RPM by a predetermined value.

2. The method of claim 1, wherein a downshifting recommendation signal for the gear stage and recommended gear stage information are output to a cluster connected to the controller.

3. The method of claim 1, wherein a downshifting recommendation signal for the gear stage and recommended gear stage information are output using a voice in the vehicle.

4. A coasting driving control method of controlling a coasting of a vehicle by moving a clutch of a transmission to a neutral position while the vehicle is being driven, the method comprising:
   determining, by a controller, virtual gear ratio for the coasting for a current driving state of the vehicle using engine RPM, vehicle speed, and gear stage information upon determining that the coasting is started with the clutch in the neutral position; and
   outputting, by the controller, a downshifting instruction signal upon determining that the virtual gear ratio for the coasting is greater than a gear ratio of a gear stage at a point in time of starting the coasting.

5. The method of claim 4, wherein the virtual gear ratio for the coasting is determined from the following Formula (1), $$\text{virtual gear ratio for coasting} = \frac{\text{engine RPM in coasting}}{\text{current vehicle speed}} \times \quad (1)$$

$$\frac{\text{vehicle speed at time point of starting to coast} \times \text{gear ratio of gear stage at time point of starting to coast}}{\text{engine RPM at time point of starting to coast}}.$$

wherein engine RPM for coasting=idling RPM+α set at a level that is configured to maintain acceleration of vehicle.

6. The method of claim 4, wherein a downshifting recommendation signal for the gear stage and recommended gear stage information are output to a cluster connected to the controller.

7. The method of claim 4, wherein a downshifting recommendation signal for the gear stage and recommended gear stage information are output using a voice in the vehicle.

8. A coasting driving control system of controlling a coasting of a vehicle by moving a clutch of a transmission to a neutral position while the vehicle is being driven, the system comprising a controller configured of:
   determining a virtual engine revolutions per minute (RPM) for a current driving state of the vehicle using engine RPM, vehicle speed, and gear stage information upon determining that the coasting is started with the clutch in the neutral position; and
   outputting a downshifting instruction signal for a gear stage upon determining that the virtual engine RPM is less than a coasting engine RPM which is greater than an idling RPM by a predetermined value.

9. The coasting driving control system of claim 8, wherein a downshifting recommendation signal for the gear stage and recommended gear stage information are output to a cluster connected to the controller.

10. The coasting driving control system of claim 8, wherein a downshifting recommendation signal for the gear stage and recommended gear stage information are output using a voice in the vehicle.

11. The coasting driving control system of claim 8, wherein the controller includes:
   a virtual revolutions per minute (RPM) calculator that determines the virtual engine RPM for the current driving state using the engine RPM, the vehicle speed, and the gear stage information upon determining that the coasting is started with the clutch in the neutral position; and
   an instruction output unit that outputs the downshifting instruction signal for the gear stage upon determining that the virtual engine RPM determined by the virtual RPM calculator is less than the coasting engine RPM which is greater than the idling RPM by the predetermined value.

12. A coasting driving control system of controlling a coasting of a vehicle by moving a clutch of a transmission to a neutral position while the vehicle is being driven, the system comprising a controller configured of:
   determining virtual gear ratio for the coasting for a current driving state of the vehicle using engine revolutions per minute (RPM), vehicle speed, and gear stage information upon determining that the coasting is started with the clutch in the neutral position; and
   outputting a downshifting instruction signal upon determining that the virtual gear ratio for the coasting is greater than a gear ratio of a gear stage at a point in time of starting the coasting.

13. The coasting driving control system of claim 12, wherein the virtual gear ratio for the coasting is determined from the following Formula (1), $$\text{virtual gear ratio for coasting} = \frac{\text{engine RPM in coasting}}{\text{current vehicle speed}} \times \frac{\text{vehicle speed at time point of starting to coast} \times \text{gear ratio of gear stage at time point of starting to coast}}{\text{engine RPM at time point of starting to coast}}. \quad (1)$$

wherein engine RPM for coasting=idling RPM+α set at a level that is configured to maintain acceleration of vehicle.

14. The coasting driving control system of claim 12, wherein a downshifting recommendation signal for the gear stage and recommended gear stage information are output to a cluster connected to the controller.

15. The coasting driving control system of claim 12, wherein a downshifting recommendation signal for the gear stage and recommended gear stage information are output using a voice in the vehicle.

16. The coasting driving control system of claim 12, wherein the controller includes:
   a virtual gear ratio calculator that determines the virtual gear ratio for the coasting for the current driving state using the engine RPM, the vehicle speed, and the gear stage information upon determining that the coasting is started with the clutch in the neutral position; and
   an instruction output unit that outputs the downshifting instruction signal upon determining that the virtual gear ratio for the coasting determined by the virtual gear ratio calculator is greater than the gear ratio of the gear stage at the point in time of starting the coasting.

* * * * *